(No Model.)
L. N. WILLIAMS.
MINER'S SAFETY LAMP.
No. 472,098. Patented Apr. 5, 1892.
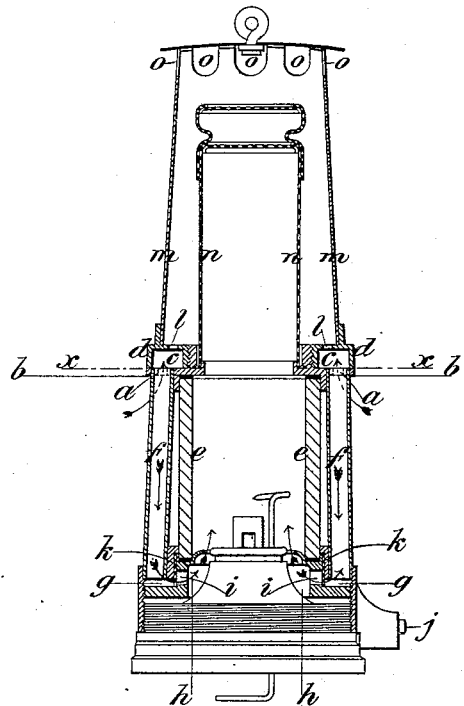
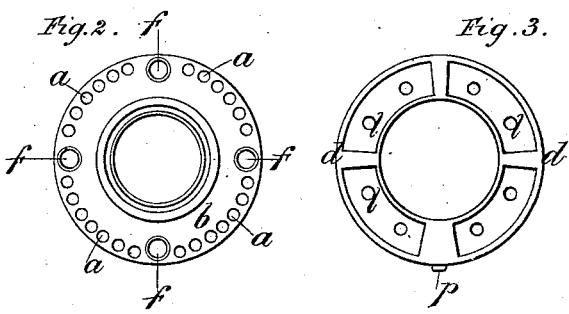
Witnesses:
J. C. Wilson
W. H. Graham
Inventor:—
Lewis Noah Williams,
by
Whitman & Wilkinson,
Attys.

United States Patent Office.

LEWIS NOAH WILLIAMS, OF ABERDARE, ENGLAND.

MINER'S SAFETY-LAMP.

SPECIFICATION forming part of Letters Patent No. 472,098, dated April 5, 1892.

Application filed July 6, 1891. Serial No. 398,548. (No model.)

*To all whom it may concern:*

Be it known that I, LEWIS NOAH WILLIAMS, a subject of the Queen of Great Britain and Ireland, residing at Aberdare, Kingdom of Great Britain and Ireland, have invented certain Improvements in Miners' Safety-Lamps, of which the following is a specification.

This invention, which relates to miners' safety-lamps, consists in an improved mode of supplying air to feed the flame.

According to this invention the air enters the lamp first through orifices in the step-top by which the glass is surmounted. These orifices communicate with an annular space at the bottom of the ring, to which the shield or bonnet is at the bottom secured. The pillars which support the step-top are tubular. At their upper ends they open into the annular space aforesaid and at their lower ends they open into a space provided around the ring on which the glass rests. The air passes down the pillars into the last-mentioned space, whence by orifices guarded by a band of gauze it is admitted to the burner at a point below the flame.

In the accompanying drawings, Figure 1 represents a part vertical section of a miner's safety-lamp constructed in accordance with this invention.

The air whereby the flame is fed with oxygen enters the lamp by orifices $a$, provided in the step-top $b$, as seen more particularly at Fig. 2, which represents a plan of the step-top on and above the line $xx$, Fig. 1. The orifices $a$ communicate with the annular space $c$ in the ring $d$, surmounting the glass $e$. Thence by the hollow pillars $f$ the air is conducted to the space $g$, provided around the ring $h$, on which the glass $e$ rests. From the space $g$ the air is admitted by the orifices $i$, guarded by the band of gauze $k$, to the burner at a level below the flame. Accordingly the air is fed to the flame in an unagitated or steady current, so that the risk of blowing the flame through the gauze is lessened and an adequate supply of air is insured.

The lamp is locked at the bottom by an ordinary binding-screw $j$, by which the outer shell is clamped to the oil-chamber.

Surplus air entering the annular space $c$ in the ring $d$ passes through orifices $l$ into the space existing between the interior of the shield or bonnet $m$ and the usual gauze chimney $n$. At Fig. 3 is shown a view of the ring $d$ inverted. The air which passes by the orifices $l$ into the space between the shield and the gauze chimney $n$ escapes with the products of combustion through the apertures $o$ at the top of the lamp.

After the ring $d$ has been screwed on in place it is, together with the bonnet, clamped to the step-top by an ordinary binding-screw $p$.

What I claim is—

1. The combination, in a miner's safety-lamp, of a step-top—such as $b$—having orifices—such as $a$—for admission of air, a hollow ring—such as $d$—into which the orifices $a$ open, tubular pillars $f$ for conducting the air from the ring $d$ to a ring—such as $h$—with annular space $g$, from which by apertures $i$, guarded by a gauze shield $k$, the air is admitted to the burner at a level below that of the flame, substantially as hereinbefore described.

2. In a miner's safety-lamp, the combination, with a step-top $b$, having orifices $a$ for the admission of air, of a hollow ring $d$, into which said orifices $a$ open, the said ring $d$ having orifices $l$ in the upper portion thereof for carrying off superfluous air, tubular pillars $f$ for conducting the air from the ring $d$ to a ring $h$, with annular space $g$, from which by apertures $i$, guarded by a gauze shield $k$, the air is admitted to the burner at a level below that of the flame, substantially as hereinbefore described.

In testimony whereof I have signed my name to this specification in the presence of two subscribing witnesses.

LEWIS NOAH WILLIAMS.

Witnesses:
    D. LLOYD PROBERT,
        9 *Park Lane, Aberdare.*
    GWILYN GRIFFITHS,
        70 *Harriet Street, Aberdare.*